United States Patent [19]

Pecháček et al.

[11] 4,194,418
[45] Mar. 25, 1980

[54] CIRCUIT ARRANGEMENT FOR THE REGULATION OF THE TRANSMISSION STAGES ON AN AUTOMATIC GEAR CHANGER

[75] Inventors: Ctirad Pecháček; Richard Sehnal, both of Prague, Czechoslovakia

[73] Assignee: Ustav pro vyzkum motorovych vozidel, Prague, Czechoslovakia

[21] Appl. No.: 935,094

[22] Filed: Aug. 21, 1978

[30] Foreign Application Priority Data

Aug. 19, 1977 [CS] Czechoslovakia ............... 5459/77

[51] Int. Cl.² .......................................... B60K 41/18
[52] U.S. Cl. ............................................. 74/866
[58] Field of Search ................................. 74/866

[56] References Cited

U.S. PATENT DOCUMENTS

| | | | |
|---|---|---|---|
| 3,267,762 | 8/1966 | Reval | 74/866 X |
| 3,439,564 | 4/1969 | Scholl et al. | 74/866 |
| 3,448,640 | 6/1969 | Nelson | 74/866 |
| 3,626,254 | 12/1971 | Kawakubo | 74/866 X |
| 3,703,109 | 11/1972 | Irie et al. | 74/866 |
| 3,748,926 | 7/1973 | Mohri et al. | 74/866 X |
| 4,041,809 | 8/1977 | Dick et al. | 74/866 |
| 4,073,204 | 2/1978 | Dick | 74/866 |

*Primary Examiner*—Lance Chandler

[57] ABSTRACT

There is disclosed an electronic circuit arrangement for the regulation of the transmission stages of an automatic gear changer employed, for example, in a vehicle. The circuit includes a monostable circuit comprising an input transistor and an output transistor, the circuit being released by a pick-up device which is responsive to the speed of the vehicle. The circuit is substantially independent of variations of ambient temperatures and is of simple design.

8 Claims, 1 Drawing Figure

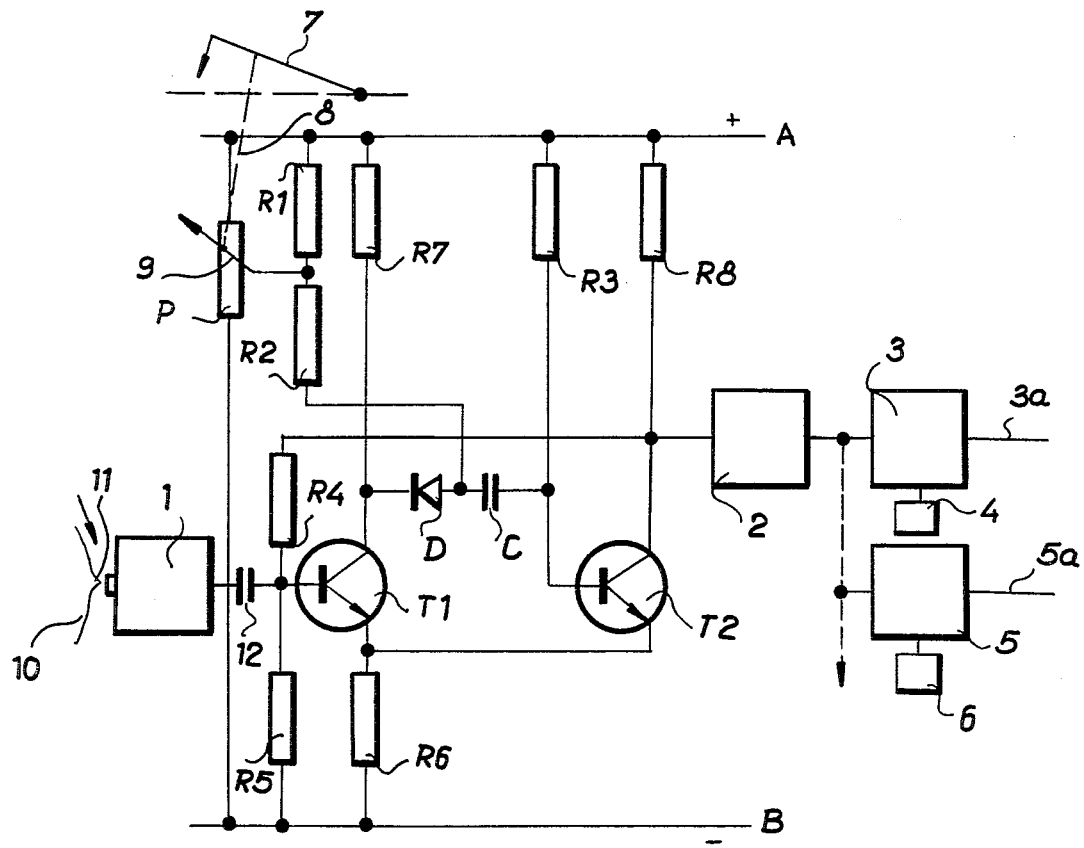

CIRCUIT ARRANGEMENT FOR THE REGULATION OF THE TRANSMISSION STAGES ON AN AUTOMATIC GEAR CHANGER

BACKGROUND OF THE INVENTION

The invention relates to a circuit arrangement for the control of the gear change points of the transmission stages of an automatic transmission, such as that of a vehicle, in dependence upon the speed of the vehicle and the position of the accelerator pedal.

With known arrangements the regulating element for the transmission stages is connected to the output of a circuit for measuring the speed of the vehicle, for instance by means of an additional transistor, to the collector of which a regulating element is connected and whereby the amplitude of a DC voltage is reduced. The regulating element can be connected to a filter, where it directly controls a DC voltage supply to inputs of logic circuits for the individual stages of a transmission. There are also known circuit arrangements wherein a change of a resistance, which together with a condenser determins the time constant of a monostable circuit, it is provided with an additional transistor connected as a variable resistance.

A drawback of the above-mentioned systems is that they are complicated. A reduction of the voltage supplied to the input of logic circuits is not advantageous since it results in a reduction of the sensitivity of these circuits. The circuit arrangement for the regulation of the time constant of the monostable circuit by an additional transistor is very much dependent on variations of the ambient temperature.

SUMMARY OF THE INVENTION

The present invention has among its objects the provision of a circuit arrangement for the regulation of the shifting points at the various stages of the transmission of an automatic gear changer of a vehicle in response to changes in the speed of the vehicle. The circuit arrangement of the invention is less complicated than those of the prior art, and is less affected by variations in ambient temperature.

In accordance with the invention, the collector of an input transistor is connected by way of a circuit means including a diode and a condenser to the base of an output transistor, the base of the output transistor being connected by way of a resistor with a voltage supply conductor. The cathode of said diode is connected to the collector of the input transistor, and the junction point between the anode of the diode and the condenser is connected by means of a resistance voltage divider with said voltage supply conductor. The junction point of the voltage divider is connected to a sliding contact of a regulating element which is electrically connected beween the voltage supply conductor and a second conductor, of opposite polarity from the voltage supply conductor, such second conductor being, for example, the frame of the vehicle. The regulating element is mechanically connected with the accelerator pedal of the vehicle. A pick-up device responsive to the speed of the vehicle is connected to the base of the input transistor, and the collector of the output transistor is connected to a filter to the inputs of one or more logic circuits, each of said logic circuits controlling the shifting point of its respective stage of the automatic transmission.

An advantage of the circuit arrangement according to the invention is a saving in the number of transistors required. The circuit arrangement of the present invention is substantially independent of variations of ambient temperature. By the combination of the resistance of the portion of the voltage divider connected to the voltage supply conductor and of the regulating element it is possible to influence within limits the torque transmitted through the automatic transmission. A further advantage of the arrangement of the invention is the fact that in the case of the interruption of the second conductor and of the sliding contact of the regulating element no upward changes, that is toward higher speeds of the vehicle, of the gear change points of the vehicle occur, and under such conditions, the automatic transmission functions normally as it would in the absence of the circuit arrangement of the present invention.

DESCRIPTION OF DRAWING

The single FIGURE of the drawing illustrates an exemplary circuit arrangement according to the invention.

DESCRIPTION OF PREFERRED EMBODIMENT

Turning now to the drawing, the circuit arrangement there shown is incorporated in a motor vehicle having a positive voltage supply conductor A and a negative conductor B, such as the vehicle frame. The vehicle is supplied with an accelerator pedal 7 and with a rotor 10 having at least one lobe 11 thereon, rotor 10 being driven in synchronism with the speed of the vehicle. The rotor 10 cooperates with a pick-up device 1 which emits a pulse upon passage of the lobe 11 past the hole of the pick-up device.

The output of the pick-up device is connected through a condenser 12 to the base of an input transistor T1, shown here as of the NPN type. The collector of transistor T1 is connected through a resistor R7 to conductor A. The emitter of transistor T1 is connected through a resistor R6 to conductor B. The collector of transistor T1 is connected to a circuit means including series connected condenser C and diode D the anode of which is connected to condenser C. The base of output transistor T2, which is also shown as being of the NPN type is connected through a resistor R3 to the voltage supply conductor A. The circuit means including condenser C and diode D is connected beyond condenser C to a wire extending between the base of transistor T2 and the resistor R3. The collector of transistor T2 is connected through a resistor R8 to the voltage supply conductor A. The emitter of transistor T2 is connected to the emitter of transistor T1 in advance of the resistor R6.

A resistor R5 is connected between the wire connecting condenser 12 and the base of transistor T1 and conductor B. The wire between condenser 12 and the base of transistor T1 is also connected through a resistor R4 to a low pass filter 2 the output of which leads to one or more logic circuits which control the shifting point of the respective stages of the automatic transmission. In the embodiment shown, there is a first logic circuit 3 which is fed through a conductor 3a with a reference voltage corresponding to the respective gear change point of the transmission stage. Logic circuit 3 controls the variation of a first gear change point of the transmission by means of a schematically shown regulating means 4. The circuit arrangement shown is provided with a second logic circuit 5, a source of a reference voltage therefor corresponding to the second gear change point of the transmission, and with a regulating element 6 controlled by the logic circuit 5. In an automatic transmission of the "HYDRA-MATIC" type, the regulating elements 4 and 6 may be means which suitably vary the hydraulic regulators for each respective planetary gear set.

The wire extending from resistor 4 to the input of the filter 2 is connected to the wire between the collector of transistor T2 and the resistor R8, as shown. Connected to the circuit means including the condenser C and the diode D, intermediate the condenser and diode and the voltage supply conductor A is a voltage divider made up of series connected resistors R1 and R2. The winding of a slide wire regulating element P is connected between conductors A and B. The slider 9 of regulating element P is connected as schematically shown at 8 to the accelerator pedal 7 of the vehicle, so that depressing the accelerator pedal 7 in varying amounts varies the voltage to which the condenser C is charged.

The described and illustrated circuit arrangement of the invention operates as follows: The impulse pick-up device 1, which detects the speed of the vehicle, releases the monostable circuit comprising transistors T1 and T2. The time constant of the circuit is determined by the values of charge on the condenser C, of the resistor R3, and the voltage of the regulating element P, from which the condenser C is charged. This voltage is reduced by the movement of the sliding contact 9, so that the time constant of the monostable circuit is thus reduced. A positive voltage pulse is generated on the collector of transistor T2, the duration of such pulse corresponding to the time constant of the monostable circuit, and the frequency is given by the speed of the vehicle. The input of the filter 2 is composed of the straight line voltage from conductor A fed to it through resistor R8 and the positive voltage pulse generated on the collector of transistor T2. From such combined voltages the filter 2 creates a mean D.C. voltage value which is directly proportional to the speed of the vehicle and indirectly proportional to the degree to which the accelerator pedal 7 has been depressed. This mean value of the voltage delivered by filter 2 is brought to the inputs of logic circuits 3, 5, etc., where it is compared with respective reference voltages thereof. By depressing the accelerator pedal 7 the gear change points are shifted toward the higher speed of the vehicle.

Although the invention is illustrated and described with reference to one preferred embodiment thereof, it is to be expressly understood that it is in no way limited to the disclosure of such a preferred embodiment, but is capable of numerous modifications within the scope of the appended claims. Thus, although the transistors T1, T2 have been shown as being of the type NPN, the same results can be achieved by using transistors of the PNP type.

What is claimed is:

1. Arrangement for the regulation of the points of shift between the transmission stages of an automatic gear changer of a motor vehicle provided with an accelerator and said automatic gear changer, comprising a direct current voltage supply source, a pick-up device responsive to the speed of the vehicle, a monostable circuit comprising a first, input transistor and a second, upput transistor, means electrically connecting the output of the pick-up device to the base of the first transistor, circuit means comprising a condenser and a variable resistor for determining the time constant of the resistor for determining the time constant of the monostable circuit, the variable resistor being provided with a sliding contact mechanically connected to the accelerator of the vehicle, means electrically connecting the full resistance of the variable resistor across the opposite terminals of the voltage supply source, a filter having an input and an output, means electrically connecting the collector of the second transistor to the input of the filter and to the positive terminal of the voltage supply circuit, a logic circuit having two inputs and an output, a source of a reference voltage for the shifting of the gear changer from one stage to another connected to one of the inputs of the logic circuit, the other of the inputs of the logic circuit being connected to the output of the filter, the logic circuit being adapted to compare the output voltage of the filter with the reference voltage, the collector of the first transistor being connected by a circuit including a series connected diode and a condenser with the base of the second transistor, circuit means connecting the base of the second transistor with the positive terminal of the voltage supply source, the cathode of the diode being electrically connected to the collector of the first resistor, the junction point between the diode and the condenser being electrically connected to the positive terminal of the voltage supply source, and the sliding contact of the variable resistor being electrically connected to the positive terminal of the voltage supply source, and means for varying the speed at which the automatic gear changer changes from said one stage to said other stage thereof, said last-named means being electrically connected to and controlled by the output of the logic circuit.

2. The arrangement of claim 1 wherein the junction point between the diode and the condenser and the positive terminal of the voltage supply source are electrically connected through a voltage divider of the resistance type, and the sliding contact of the variable resistor is electrically connected to the positive terminal of the voltage supply source through a portion of the resistance of the voltage divider.

3. Arrangement according to claim 1, wherein the base of the second transistor is connected to the positive terminal of the voltage supply source through a resistor.

4. Arrangement according to claim 1, wherein the collector of the second transistor is connected to the positive terminal of the voltage supply source through a resistor.

5. Arrangement according to claim 1, wherein the parallel connected emitters of the first and second transistors are connected to the negative terminal of the voltage supply source through a resistor.

6. Arrangement according to claim 1, wherein the input of the filter is connected to the base of the first transistor through a resistor.

7. Arrangement according to claim 1, wherein the base of the first transistor is connected to the negative terminal of the voltage supply source through a resistor.

8. Arrangement according to claim 1, wherein said automatic gear changer has a plurality of points of shift between transmission stages, and comprising a plurality of logic circuits each having its respective reference voltage source and a means for varying the speed at which the automatic gear changer changes from one stage to another associated therewith, the inputs of the logic circuits being connected in parallel.

* * * * *